2,790,786

TRICHLOROMETHYL HALOGEN BENZENES AND PROCESS OF MAKING SAME

Eduard Moergeli, Basel, Switzerland, assignor to Ciba Limited, Basel, Switzerland, a Swiss firm No Drawing. Application July 5, 1955, Serial No. 520,099

Claims priority, application Switzerland July 8, 1954

6 Claims. (Cl. 260—651)

This invention relates to a process for the manufacture of trichloromethyl benzenes which are halogenated in the nucleus, wherein chlorine is reacted at a temperature above 150° C. upon a bis-(trichloromethyl) benzene which contains a halogen atom in o-position to a trichloromethyl group.

As starting materials which are suitable for the present process the following compounds may be mentioned:

1,4-bis-(trichloromethyl)-2,5-dichlorobenzene,
1,3-bis-(trichloromethyl)-4,6-dichlorobenzene,
1,4-bis-(trichloromethyl)-2-brombenzene,
1,4-bis-(trichloromethyl)-2-fluorobenzene but especially
1,4-bis-(trichloromethyl)-2-chlorobenzene and
1,3-bis-(trichloromethyl)-4-chlorobenzene.

These compounds can easily be prepared from the corresponding dimethyl-halogen benzenes, for example according to the directions of French Patent No. 663,791 and U. S. Patent No. 2,132,361 by halogenation with exposure to light at elevated temperature.

The reaction of the invention takes place according to the following scheme:

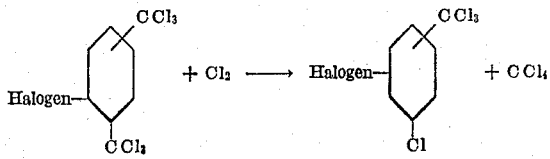

the trichloromethyl group adjacent to the halogen atom being replaced by a chlorine atom but the other being practically unattached. When the halogen atom which is attached to the nucleus is a bromine atom, it is as a rule in this reaction likewise replaced by a chlorine atom.

As specified above, the reaction temperatures to be applied for this reaction lie above 150° C. Most advantageously a temperature of 220–260° C. is employed. The progress of the reaction can be followed by observation of the quantity of carbon tetrachloride distilling off.

In most cases it is of advantage to combine the preparation of the bis-(trichloromethyl)-benzenes with the execution of the present process and thus to avoid the isolation of these compounds. For this purpose the nuclear-halogenated dimethyl benzenes are first chlorinated under the conditions customary for side chain chlorination and then chlorine is further passed in at a higher temperature until the calculated quantity of carbon tetrachloride has been formed.

Among the products obtainable according to the present process, 1-trichloromethyl-3:4-dichlorobenzene is of especial interest, since by hitherto customary processes, avoiding uneconomic methods of preparation, as for example treatment of 3-chloro-4-hydroxy-1-methyl benzene with phosphorus pentachloride or by the Sandmeyer reaction upon 3-chloro-4-amino-1-methyl benzene, but using nuclear chlorination of methyl benzene and subsequent side chain chlorination of 3:4-dichloro-1-methyl benzene, it is only obtained in unsatisfactory yield. The reason for this is that in the nuclear chlorination of methyl benzene, together with more highly chlorinated secondary products, the five theoretically possible methyl-dichlorobenzenes occur in admixture.

The nuclear halogenated trichloromethyl benzenes obtained according to the present process constitute valuable intermediate products, they can be used as such, but especially after hydrolysis to the corresponding acid chlorides, for example for the manufacture of dyestuffs.

The following examples illustrate the invention, the parts being by weight unless otherwise stated and the relation between part by weight and part by volume being the same as that between the gram and the cubic centimeter:

Example 1

160 parts of chlorine gas in a good state of distribution are passed, with exposure to light, into 347.5 parts of 1:4-bis-(trichloromethyl)-2-chlorobenezne at a temperature of 240–250° C. for a period of 9 hours during which about 155 parts of carbon tetrachloride distill off. The crude product (260 parts) which results is subjected to fractional distillation, whereby together with a small first running, 201 parts are obtained of pure 1-trichloromethyl-3:4-dichlorobenzene of boiling point 138–140° C. under 12 mm. pressure.

Example 2

With the exclusion of light, 68 parts of chlorine gas are passed at 210–220° C. during 5 hours into 138 parts of 1:4-bis-(trichloromethyl)-2-chlorobenzene and at the same time 30 parts of carbon tetrachloride distilled off. From the crude product there can be separated by fractional distillation 41 parts of a liquid boiling at 150–155° C. (17 mm.) and 74 parts of a liquid boiling at 155–203° C. (17 mm.). The first fraction consists of practically pure 1-trichloromethyl-3:4-dichlorobenzene and can be converted by known methods into 3:4-dichloro-1-benzoyl chloride and 3:4-dichloro-1-benzoic acid, which melts at 199–200° C. The second fraction contains for the most part unreacted starting material.

Example 3

With exposure to light, 300 parts of chlorine gas are passed at 100–110° C. in two hours into 75 parts of 1:4-dimethyl-2-chlorobenzene, then 150 parts of chlorine gas within 3 hours at 170–180° C. and finally a further quantity of chlorine at 220–250° C. until the formation of carbon tetrachloride is practically complete. In subsequent fractional distillation 92 parts are obtained of pure 1 - trichloromethyl - 3:4 - dichlorobenzene (boiling point 142–145° C. under 13 mm. pressure).

Example 4

From 174 parts of 1:3-bis-(trichloromethyl)-4-chlorobenzene, by passage of chlorine gas at 240–250° C., 77 parts of carbon tetrachloride are split off. On fractional distillation 1-trichloromethyl-3:4-dichlorobenzene is obtained in good yield.

Example 5

From 120 parts of 1:4-bis-(trichloromethyl)-2:5-dichlorobenzene, by passage of chlorine at 240–250° C., 64 parts of carbon tetrachloride are split off. The fraction passing over at 160–165° C. (11 mm.) on fractional distillation proves to be 1-trichloromethyl-2:4:5-trichlorobenzene and gives by hydrolysis 2:4:5-trichloro-1-benzoic acid which melts at 162–163° C.

Example 6

With exposure to light 450 parts of chlorine gas are passed at 110° C. into 277.5 parts of 1:4-dimethyl-2-bromobenzene, and then about a further 450 parts at 160–170° C. with good distribution. As soon as the formation of carbon tetrachloride can be ascertained, the temperature is raised to 240–250° C. and the passage of chlorine gas is continued until 230 parts of carbon tetrachloride have been split off and distilled. From the residue there is obtained by fractional distillation in good yield pure 1-trichloromethyl-3:4-dichlorobenzene.

*Example 7*

Chlorine gas is passed with good distribution into 165.5 parts of 1:4-bis-(trichloromethyl)-2-fluorobenzene during 5 hours at 270° C. until in the collected distillate of 40 parts by volume, 27 parts of carbon tetrachloride are contained. From the reaction mixture, which still contains mostly starting material, by fractional distillation 22.5 parts of pure 1-trichloromethyl-3-fluoro-4-chlorobenzene can be separated. It is a colorless liquid, boiling at 113–113.5° C. (12 mm.) and can be hydrolysed, for example with concentrated sulfuric acid, to 3-fluoro-4-chloro-1-benzoic acid (melting point 188–189.5° C.).

The 1:4-bis-(trichloromethyl)-2-fluorobenzene (M. P. 74° C.) can be obtained from 1:4-dimethyl-2-fluorobenzene by chlorination by known methods.

What is claimed is:

1. A process for the manufacture of trichloromethyl benzenes which are halogenated in the nucleus, which comprises reacting at a temperature above between 150° and about 270° C. chlorine with a bis-(trichloromethyl)-benzene which contains a halogen atom in ortho position to a trichloromethyl group.

2. A process for the manufacture of trichloromethyl benzenes which are halogenated in the nucleus, which comprises reacting at a temperature between 220° and 260° C. chlorine with a bis-(trichloromethyl)-benzene which contains a halogen atom in ortho position to a trichloromethyl group.

3. A process for the manufacture of 1-trichloromethyl-3,4-dichlorobenzene which comprises reacting at a temperature between 220° and 260° C. chlorine with 1,4-bis-(trichloromethyl)-2-chlorobenzene.

4. A process for the manufacture of 1-trichloromethyl-3,4-dichlorobenzene which comprises reacting at a temperature between 220° and 270° C. chlorine with 1,3-bis-(trichloromethyl)-4-chlorobenzene.

5. A process for the manufacture of 1-trichloromethyl-3,4-dichlorobenzene which comprises reacting at a temperature between 220° and 260° C. chlorine with 1,4-bis-(trichloromethyl)-2-bromobenzene.

6. A process for the manufacture of 1-trichloromethyl-3-fluoro-4-chlorobenzene which comprises reacting at a temperature between 220° and 260° C. chlorine with 1,4-bis-(trichloromethyl)-2-fluorobenzene.

No references cited.